Figure 1:
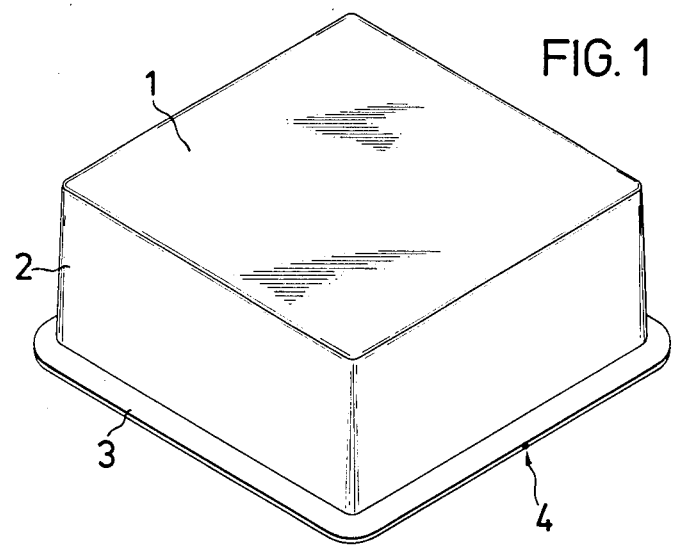

United States Patent [19]

Bormüth

[11] Patent Number: 4,622,002
[45] Date of Patent: Nov. 11, 1986

[54] CONTAINER MOLDING APPARATUS

[75] Inventor: Horst Bormüth, Egelsbach, Fed. Rep. of Germany

[73] Assignee: Hoechst Aktiengesellschaft, Frankfurt, Fed. Rep. of Germany

[21] Appl. No.: 633,530

[22] Filed: Jul. 23, 1984

Related U.S. Application Data

[62] Division of Ser. No. 479,568, Mar. 28, 1983, abandoned.

[30] Foreign Application Priority Data

Apr. 8, 1982 [DE] Fed. Rep. of Germany ....... 3213224

[51] Int. Cl.$^4$ .................. B29C 45/00; B29C 45/42
[52] U.S. Cl. .................... 425/577; 249/109; 249/144; 264/328.1; 264/328.12
[58] Field of Search ............... 425/542, 548, 566, 577; 264/328.1, 328.9, 328.16, 537, 328.12; 249/105, 109, 144

[56] References Cited

U.S. PATENT DOCUMENTS

| | | | |
|---|---|---|---|
| 2,450,482 | 10/1948 | Morin | 264/328.1 |
| 3,169,688 | 2/1965 | Schad | 229/1.5 B |
| 4,111,622 | 9/1978 | Sutch | 425/542 |

FOREIGN PATENT DOCUMENTS

| | | |
|---|---|---|
| 35035 | 9/1979 | European Pat. Off. . |
| 2214361 | 10/1973 | Fed. Rep. of Germany . |
| 779685 | 7/1957 | United Kingdom . |
| 858887 | 1/1961 | United Kingdom . |
| 2071563 | 9/1981 | United Kingdom . |

OTHER PUBLICATIONS

"Molder's Guide to Injection Molding", W. R. Grace and Co. 8/7/58.
"Injection Molding Theory and Practice", Irvin I. Rubin, Jun. 6, 1973, pp. 124–126.

Primary Examiner—Jay H. Woo
Assistant Examiner—Timothy W. Heitbrink
Attorney, Agent, or Firm—Connolly and Hutz

[57] ABSTRACT

A thin-walled, injection-molded plastic container having a thickened sealing rim acquires a particularly smooth sealing rim, onto which a covering film can be sealed in a bacteria-tight, gas-tight and liquid-tight manner, if the gate is located on the sealing rim instead of on the bottom of the container.

1 Claim, 6 Drawing Figures

CONTAINER MOLDING APPARATUS

This application is a division of application Ser. No. 479,568 filed Mar. 28, 1983 now abandoned.

The present invention relates to a thin-walled, injection-molded plastic container having a smooth, thickened sealing rim, in which the gate is on the sealing rim, and to an apparatus for its manufacture.

Cups and cup-like products, for example cans, are used as packaging for liquid, pasty or solid contents. For the packaging of dairy products, edible fats, marinades and other foodstuffs in particular, there is a great demand for packaging of this type. As a rule, after having been filled, the package is closed in a bacteria-tight, gas-tight and liquid-tight manner by heat-sealing a covering film onto it. The container wall may be conical or cylindrical, and may be smooth or be profiled by having bar-shaped, ring-shaped or lozenge-shaped stiffening.

Thin-walled drinking cups, produced by injection molding and having ring-shaped wall stiffenings and a thickened rim have already been disclosed (cf. U.S. Pat. No. 3,169,688). They are preferably used for dispensing hot drinks. An essential feature of these cups is the central position of the gate on the outside of the inwardly-domed bottom. It is true that such cups have adequate resistance to fracture and are suitable for use as drinking cups, but the cup rim does not possess the degree of smoothness which is essential for sealing a covering film onto it in a bacteria-tight, gas-tight and liquid-tight manner. The defective nature of the cup rim is attributable to the position of the gate. To obtain a rim which is free from flash, injection has to be effected at high speed, and with the mold tightly closed.

In such injection molding, the flow front may become heated, by the adiabatic compression of the air trapped in the mold, to a degree where thermal degradation of the plastic material in the front zone, from which the cup rim is formed, occurs.

This thermal degradation causes not only inadequate smoothness of the rim but also, under certain circumstances, inadequate adhesion of the covering film sealed onto it. A reduction in injection speed makes the process of manufacture uneconomical and leads to the container rim being inadequately formed, partly due to the fact that the plastic then has inadequate flow and partly because of the inadequate action of the follow-up pressure on the bottom zone and on the peripheral wall zone of the container. The consequences are raggedness, sink marks, voids and other flaws on the container rim. The disadvantages described are the greater, the longer the flow path from the gate to the remotest corner of the mold, i.e., in the present case, to the container rim, and also the thinner the cup wall and the colder the mold. For this reason, injection-molded rotationally symmetrical containers have hitherto been provided with a gate located on the axis of rotation, so as to keep the flow paths as short as possible (cf. Plastverarbeiter, 1961, page 453 et seq. and 504 et seq., and FIGS. 16, 17, 27 and 28).

Thin-walled plastic cups with a thickened rim, which have been produced by thermoforming from a piece of sheet which has been rendered plastic by heating, have also been disclosed (cf. German Offenlegungsschrift No. 2,214,361). However, thermoformed articles have the disadvantage that they cannot be stiffened by bars and ribs to the same degree as injection-molded articles. Moreover, the rim can only be plane or knurled, a shape which does not meet all requirements of practical packaging. Finally, thermoformed articles have a markedly lower wall thickness in the corner zones and edge zones.

Finally, it was also known that in the manufacture of a bottle-like hollow article by injection molding, the gate can be located in the vicinity of the upper orifice (on the neck) (cf. European Published Patent Application No. 35,035). However, this gate is provided additionally to the gate at the bottom of the hollow article in order to achieve a certain molecular orientation of the polyester employed, in the region of the bottle neck. Problems concerning the flow of the plastic do not occur with this hollow article, because of the high wall thickness.

Accordingly, there is a substantial demand for thin-walled containers having a thickened, smooth sealing rim. Since they are to be used as packagings, the containers require to be manufactured cheaply.

We have found that this object can be achieved if the containers are produced by injection molding and the gate is not located on the container bottom but on the sealing rim, and preferably on the outside of the rim.

Accordingly, the present invention relates to the container described in the claims, and to the process and apparatus for its manufacture.

Containers are to be understood to mean all plastics containers which are open at the top and have walls ranging from conical to almost cylindrical, the ratio of height to maximum diameter being entirely arbitrary. Preferably, the height is half to three times the maximum diameter. The height is about 5 to 15 cm and the maximum diameter is up to about 10 cm. The container according to the invention can have any desired cross-section, but preferably the cross-section is circular.

The container according to the invention consists of a bottom, the side wall and the sealing rim. The bottom, being devoid of a gate, is preferably smooth. The side wall can also be smooth but may also be provided with thickened ribs, which may be circular, bar-shaped or lozenge-shaped. A particular embodiment of the container according to the invention has, below the sealing rim, a cylindrical portion of the side wall which merges into the remainder of the side wall via a rounded stacking rim which may, if desired, protrude outward. The only precondition is that the outside diameter of the stacking rim should be less than that of the sealing rim. In place of the cylindrical portion, a conical portion tapering in the opposite direction to the container may be provided. At the top, the container terminates in a thickened, smooth sealing rim. This sealing rim may, according to requirements, be plane or bead-shaped.

The wall thickness of the container according to the invention is, for economic reasons, as low as possible, namely in the range from 0.25 to 0.75 mm. The sealing rim is 2 to 10 mm wide and 0.5 to 2 mm thick.

The container according to the invention may be manufactured from all customary thermoplastics, which may, if desired, be mass-colored and/or contain a light-screening pigment. Preferably, partially crystalline injection molding compositions, such as polypropylene, polyethylene and copolymers of ethylene and propylene are used. Polypropylene is particularly preferred.

The container is manufactured by injection molding. The gate is located on the sealing rim of the container. The gate can be on the outside or on the inside of the sealing rim but is preferably on the outside. This arrangement has the effect that on injection of the melt the rim is formed first and the melt flows from this portion of the mold, in accordance with the principle of an overflowing weir, into the mold cavity zones for the side wall and bottom of the container. The effect is that during the subsequent cooling the container rim solidifies whilst under the action of the follow-up pressure and accordingly is formed perfectly in spite of being thicker, and in particular formed perfectly with a plane or rounded shape. Thermal degradation, and the consequences thereof, which have been described, do not arise. The requisite mold cavity venting for perfect formation of the side wall and bottom zones can be ensured on the one hand by having a split injection mold and on the other hand by a venting gap in the mold core. It was not foreseeable that with this position of the gate and with the extremely narrow flow channels a perfect injection molding could be formed.

The injection molding of the plastic container according to the invention is effected in accordance with the processes known for the various thermoplastics. The process data, such as, for example, material temperature, mold temperature, injection pressure and injection time, and follow-up pressure may be found in the relevant brochures and leaflets. They depend on the dimensions of the containers to be injection molded.

In the apparatus to be used for the manufacture of the container according to the invention, the runner is so arranged that the gate is subsequently located on the sealing rim of the container. Though the known apparatuses, which have the runner at the bottom of the container, can be refitted by shifting the runner to the sealing rim, it is preferred to use a special apparatus.

This apparatus consists of two symmetrical mold halves which possess recesses which each correspond to one half of the outer shape of the container to be manufactured. The two mold halves surround a core which corresponds to the inner shape of the container. Accordingly, the mold halves and the core form, between them, the mold cavity for the container to be manufactured. The lengthwise axis of the core is in the mold parting plane. In one mold half, the runner is so arranged that it terminates at the part of the mold cavity in which the sealing rim of the container is formed.

The core is provided with appliances which facilitate removing the container. For this purpose, the part of the core which is in contact with the bottom of the container is preferably constructed as a valve disk which is movable in the direction of the lengthwise axis and allows the passage of the compressed air which strips the container from the core. If containers with a concave bottom or a bottom with a rim which facilitates standing are to be produced, it is advisable to make the entire core movable in the lengthwise direction, and this can be effected by inclined tie-bars, rectangular guides, dovetail guides or hydraulically.

Figure 6:
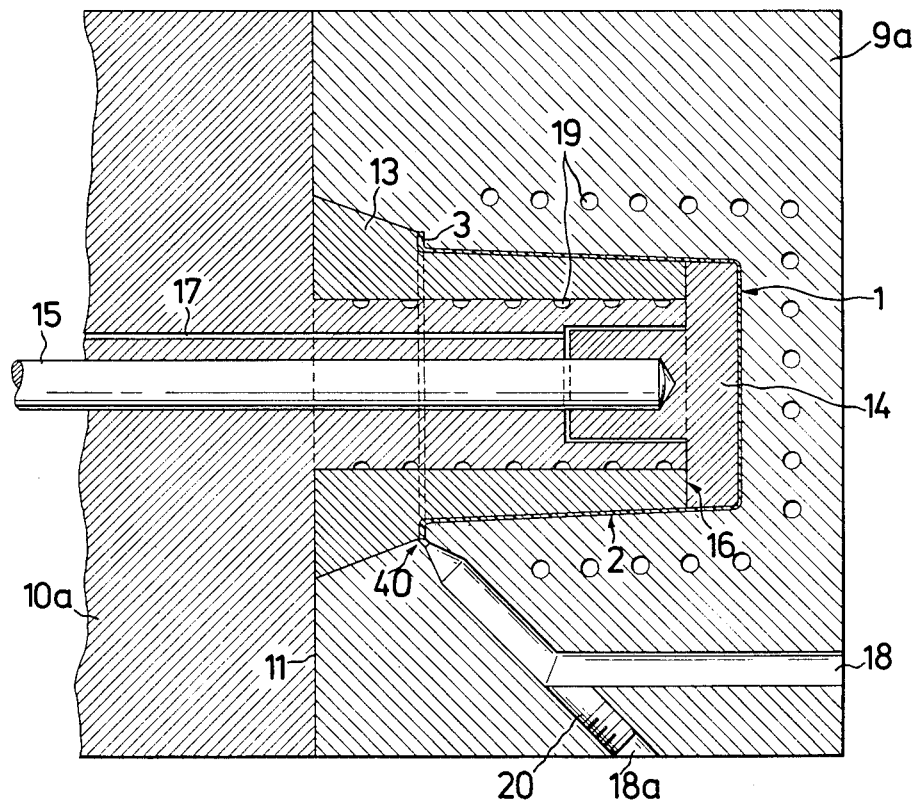
Figure 4:
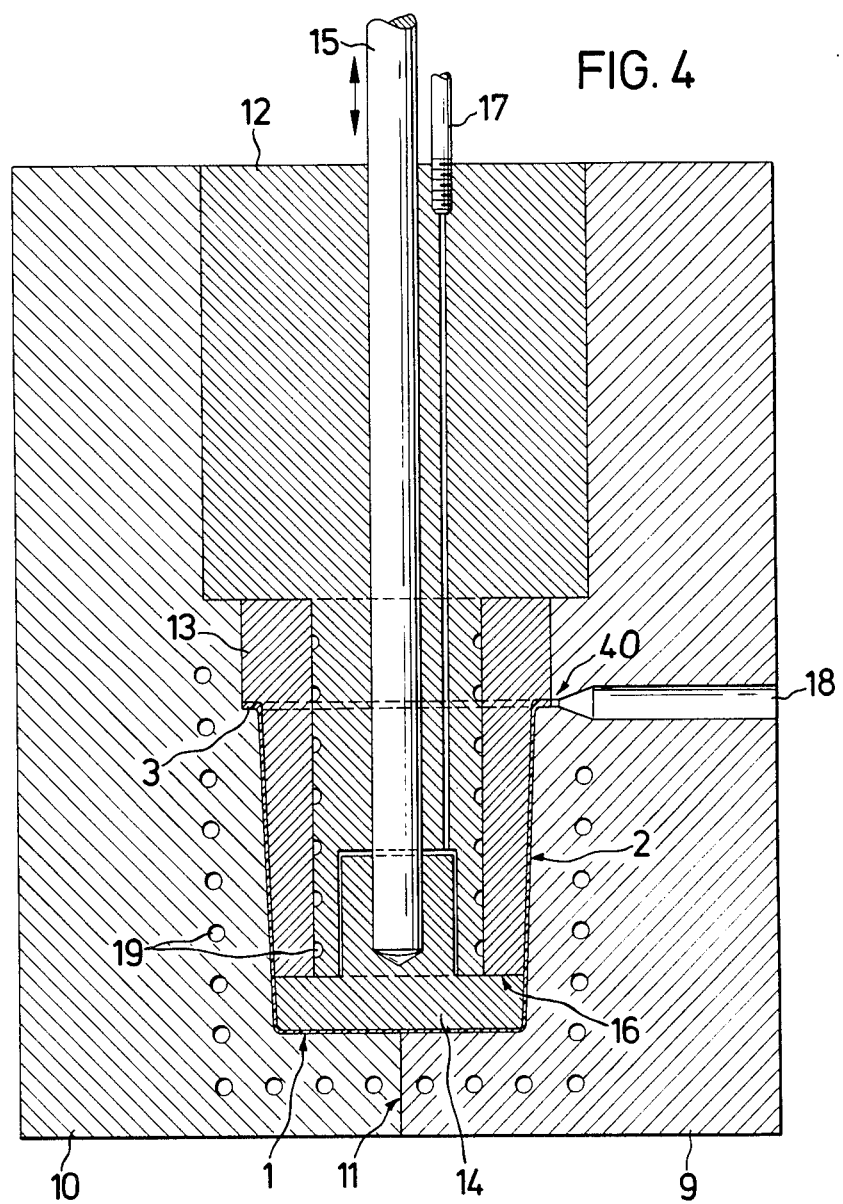
Figure 5:
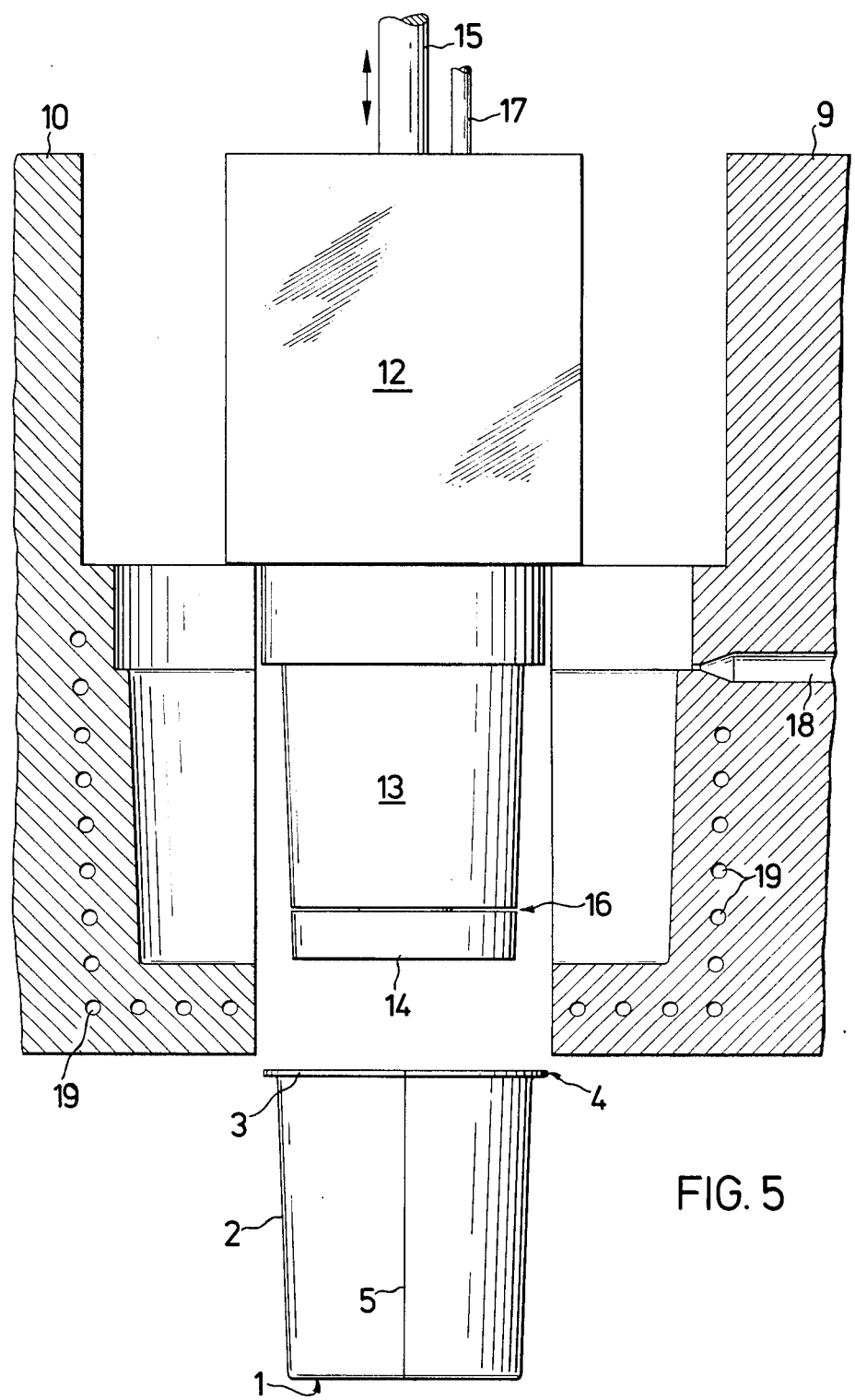

The figures illustrate containers according to the invention and apparatus for their manufacture. In particular, FIG. 1 shows the general shape of a rectangular container, FIG. 2 shows a round cup, FIG. 3 shows a round cup with reinforcing ribs, FIG. 4 shows a preferred apparatus for the manufacture of the containers, the apparatus being in the closed state, FIG. 5 shows the same apparatus in the opened state, and FIG. 6 shows another possible version of an apparatus for the manufacture of a container according to the invention.

On the container according to FIG. 1, which may be used, for example, for packaging dairy products, such as margarine, butter, fresh cheese, processed cheese and the like, there may be seen the gateless container bottom (1), the container side walls (2) and the sealing rim (3) with the gate (4).

Figure 2:
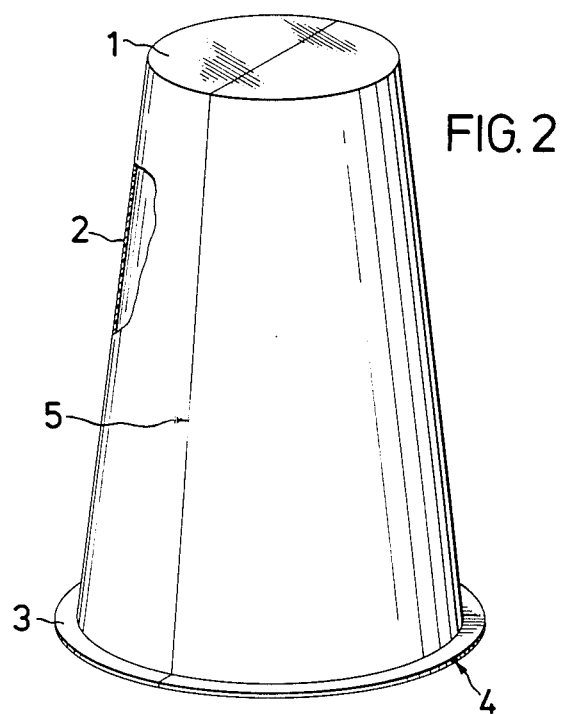

FIG. 2 shows a cup with a smooth side wall. In the smooth cup bottom (1) is discernible the mark (5) of the mold parting plane, which extends over the smooth, conical side wall (2) and the underside of the thickened sealing rim (3). The gate mark (4) is located on the outside of the sealing rim (3), at right angles to the plane (5).

Figure 3:
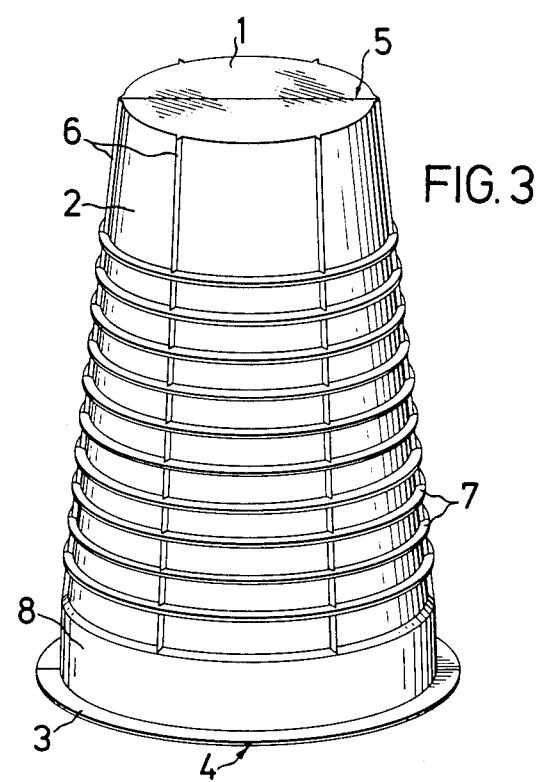

FIG. 3 shows a preferred embodiment of the cup according to the invention. This again shows the mark (5) of the mold parting plane in the smooth cup bottom (1), on the underside of the thickened sealing rim (3) and in the cylindrical portion (8) of the side wall (2). Two of the bar-shaped lengthwise ribs (6) which are present coincide with the mold parting plane. In addition, the side wall (2) is also strengthened by ring-shaped transverse ribs (7). The gate mark (4) is discernible on the outside of the sealing rim.

FIG. 4 shows a preferred apparatus for the manufacture of the container according to the invention, the apparatus being depicted in the closed state. The two mold halves (9) and (10) surround the core holder (12) and the core (13) in such a way that the mold cavity for the container is formed between the mold halves (9) and (10) and the core (13), the container consisting of the bottom (1), the side wall (2), the sealing rim (3) and the gate mark (4). The mold parting plane is indicated by (11). The part of the core (13) which faces the bottom (1) of the container is constructed as a valve disk (14) which can be moved by the connecting rod (15), so that an annular gap (16) can be formed between the valve disk and the remainder of the core. Compressed air flows through the line (17) into the interior of the core. The runner (18) is so arranged in the mold half (9) that it terminates at the gate mark (4) on the sealing rim (3) of the container.

The apparatus is provided with the conventional and known devices for cooling, for example via the channels (19), for temperature control of the runner (18), for clamping the apparatus onto the clamping platens of the injection molding machine, for connection to the injection nozzle and for moving the mold halves (9) and (10), the core holder (12) and the connecting rod (15), these devices not being shown in FIG. 4.

To manufacture the container, the plastic melt is injected, with the apparatus closed, from an injection unit, which is not shown, through the runner (18) into the mold cavity, there first forms the sealing rim (3) and then flows, in accordance with the principle of an overflowing weir, into the zones of the side wall (2) and of the bottom (1). After a sufficient cooling time, the apparatus is opened, the mold halves (9) and (10) being moved apart and the core holder (12) also being moved by means of a suitable device by half the amount of the opening stroke of the mold halves, and in the same direction, so that the container can be removed from the apparatus. As a rule, only the mold half which does not possess the runner, namely in the present instance the mold half (10), is moved when opening the apparatus, whilst the other mold half (9) remains static. The movement of the core carrier (12) takes place in the same direction, and at the same time the connecting rod (15) presses the valve disk (14) downwards by a small amount, so that a narrow gap (16) is formed between the valve disk (14) and the remainder of the core (13), through which gap compressed air coming through the line (17) flows and strips the container from the core.

FIG. 5 shows the apparatus in the opened state, after the container has been stripped from the core. The gap (16) between the valve disk (14) and the remainder of the core (13) has not yet been closed. The mark (5) of the mold parting plane (11) is discernible on the container.

FIG. 6 shows a possible way of adapting a conventional apparatus for the manufacture of containers to the manufacture of the plastic container according to the invention. Such an apparatus consists of a female mold half (9a) and a male mold half (10a) with core (13). The runner (18) passes through the female mold half (9a) to the gate (40). A plug (20) seals off the lateral bore (18a).

Using the apparatus according to the invention it is of course possible to manufacture not only containers having smooth, thickened sealing rims but also containers which are not intended to be sealed and instead are only required to have a smooth, non-thickened rim.

EXAMPLE

The cup shown in FIG. 3, which has a thickened, plane sealing rim and a stiffened side wall was injection-molded from polypropylene. It had the following dimensions:

| | |
|---|---|
| Cup height | 90 mm |
| Ratio cup height:outside diameter of the sealing rim (3) | 1.25:1 |
| Wall thickness of the cup bottom (1) | 0.35 mm |
| Wall thickness of the side wall (2) | 0.35 mm |
| Wall thickness of the plane sealing rim (3) | 1.00 mm |
| Width of the sealing rim (3) | 3.00 mm |
| Width of the transverse ribs (7) | 0.60 mm |
| Height of the transverse ribs (7) | 1.00 mm |
| Number of transverse ribs (7) | 9 |
| Weight of the cup | 7.2 g. |

The cup was manufactured in a cooled injection mold according to FIGS. 5 and 6, using a cycle time of 2 seconds, of which 1.2 seconds were attributable to the injection time and cooling time and 0.8 second to the subsidiary times for demolding and for closing the mold.

I claim:

1. Apparatus for injection molding a thin-walled plastic container, the container having an inner shape and an outer shape, a bottom wall, a side wall and a smooth, thickened flat sealing rim outwardly of the side wall for sealing the rim of the container with a covering sheet, the apparatus comprising two symmetrical mold halves that engage one another along a mold parting plane, each mold half having a recess corresponding to one half of the outer shape of the thin-walled plastic container to be manufactured, a core within the mold halves corresponding to the inner shape of the container, the core being spaced from the mold halves to produce a container having side and bottom wall thicknesses in the range of 0.25 to 0.75 mm, the core having a longitudinal axis in the mold parting plane and a runner arranged in one of the two mold halves terminating in a part of the mold cavity in which the sealing rim of the container is formed whereby a gate mark is formed by the runner on a outside surface of the sealing rim.

* * * * *